United States Patent
Darolia

(10) Patent No.: US 6,630,250 B1
(45) Date of Patent: Oct. 7, 2003

(54) ARTICLE HAVING AN IRIDIUM-ALUMINUM PROTECTIVE COATING, AND ITS PREPARATION

(75) Inventor: Ramgopal Darolia, West Chester, OH (US)

(73) Assignee: General Electric Co., Cincinnati, OH (US)

( * ) Notice: Subject to any disclaimer, the term of this patent is extended or adjusted under 35 U.S.C. 154(b) by 0 days.

(21) Appl. No.: 09/917,587

(22) Filed: Jul. 27, 2001

(51) Int. Cl.[7] .............................. B32B 15/04; F03B 3/12
(52) U.S. Cl. .................... 428/632; 428/469; 428/652; 428/669; 428/670; 428/699; 428/701; 428/702; 427/252; 205/257; 205/264; 416/241 R
(58) Field of Search ................. 428/632, 652, 428/656, 669, 670, 629, 469, 699, 701, 702, 332, 336; 427/252; 205/257, 264; 416/241 R

(56) References Cited

U.S. PATENT DOCUMENTS

| | | |
|---|---|---|
| 3,639,219 A | 2/1972 | Skomoroski |
| 4,399,199 A | 8/1983 | McGill et al. |
| 4,721,551 A | 1/1988 | Byers et al. |
| 5,914,189 A | 6/1999 | Hasz et al. |
| 6,168,875 B1 | 1/2001 | Cybulsky et al. |
| 6,296,447 B1 * | 10/2001 | Rigney et al. |

OTHER PUBLICATIONS

Hideki Hosoda et al., "Potential of IrAl base alloys as ultrahigh–temperature smart coatings", *Intermetallics*, vol. 8, 2000, pp. 1081–1090. (No Month).

* cited by examiner

Primary Examiner—Deborah Jones
Assistant Examiner—Jennifer McNeil

(57) ABSTRACT

An article substrate is protected by a protective structure overlying a surface of the article substrate. The protective structure includes a protective coating that is formed by depositing a layer of iridium overlying the surface of the substrate, depositing a layer of aluminum overlying the layer of iridium, and heating the substrate, the layer of iridium, and the layer of aluminum to form an iridium-aluminum protective coating overlying the substrate. A ceramic thermal barrier coating may be applied over the protective coating.

11 Claims, 3 Drawing Sheets

ARTICLE HAVING AN IRIDIUM-ALUMINUM PROTECTIVE COATING, AND ITS PREPARATION

This invention relates to the protection of surfaces from excessive oxidation using an iridium-aluminum protective coating and, more particularly, to the prevention of excessive oxidation of the protected surface.

BACKGROUND OF THE INVENTION

In an aircraft gas turbine (et) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor and fan. In a more complex version of the gas turbine engine, the compressor and a high pressure turbine are mounted on one shaft, and the fan and low pressure turbine are mounted on a separate shaft. The hot exhaust gases flow from the back of the engine, driving it and the aircraft forward.

The hotter the combustion and exhaust gases, the more efficient is the operation of the jet engine. There is thus an incentive to raise the combustion and exhaust-gas temperatures. The maximum temperature of the combustion gases is normally limited by the materials used to fabricate the turbine vanes and turbine blades of the turbine, upon which the hot combustion gases impinge. In current engines, the turbine vanes and blades are made of nickel-based superalloys, and can operate at temperatures of up to about 1900–2150° F.

Many approaches have been used to increase the operating temperature limits of turbine blades, turbine vanes, and other hot-section components to their current levels. For example, the composition and processing of the base materials themselves have been improved, and a variety of solidification techniques have been developed to take advantage of oriented grain structures and single-crystal structures. Physical cooling techniques may also be used.

The surfaces of the articles may be protected with an aluminum-containing protective coating, whose surface oxidizes to an aluminum oxide scale that inhibits further oxidation of the surfaces. However, the aluminum oxide scale is relatively permeable to oxygen. During service, oxygen diffuses from the environment and through the aluminum oxide scale to the underlying aluminum-containing protective coating, whereupon more aluminum oxide is formed, and to the substrate. The formation of too much aluminum oxide may lead to spallation of the aluminum oxide scale, consumption of the aluminum in the aluminum-containing protective coating, and the loss of protection of the underlying substrate. The additional oxidation of the substrate leads to dimensional changes and loss of strength in the substrate.

There is therefore a need for an improved approach to the aluminum-containing protective coatings on surfaces of materials used at high temperatures, such as nickel-base superalloys. The present invention fulfills this need, and further provides related advantages.

BRIEF SUMMARY OF THE INVENTION

The present invention provides an aluminum-containing protective coating that is modified to have improved resistance to oxygen penetration, and a method for its preparation. The present protective coating may be used as an environmental coating or as a bond coat for an overlying ceramic thermal barrier coating.

A protected article comprises a substrate, preferably a nickel-base alloy such as a nickel-base superalloy, and a protective structure overlying a surface of the substrate. The protective structure comprises an iridium-aluminum protective coating overlying the surface of the substrate. A ceramic thermal barrier coating may overlie the protective coating.

The protective coating preferably comprises at least about 70 percent by weight iridium, and most preferably comprises from about 70 to about 90 percent by weight iridium. The protective coating preferably has a thickness of from about 10 micrometers to about 125 micrometers.

A method of protecting an article comprises the steps of providing a substrate including at least a portion of the article, and depositing a protective structure overlying a surface of the substrate. The protective structure comprises an iridium-aluminum protective coating overlying the surface of the substrate. Preferably, the iridium-aluminum protective coating is deposited by depositing a layer comprising iridium overlying the surface of the substrate, depositing a layer comprising aluminum overlying the layer comprising iridium, and heating the substrate, the layer comprising iridium, and the layer comprising aluminum to form the iridium-aluminum protective coating. The protective coating also typically includes elements diffused into the protective coating from the substrate, such as nickel, chromium, and the like, and may additionally be doped with modifying elements.

In this layered system, the iridium-aluminum protective coating oxidizes to form an aluminum oxide scale that protects the substrate article from excessively rapid oxidation. The iridium-aluminum protective layer itself also serves as an oxygen barrier layer in service to protect the substrate against excessive oxidation. The iridium-aluminum protective layer, because of the low permeability of oxygen in high-iridium alloys, inhibits the diffusion of oxygen to the underlying substrate. The use of an iridium-aluminum alloy, rather than pure iridium, prevents the iridium from vaporizing at elevated temperatures.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
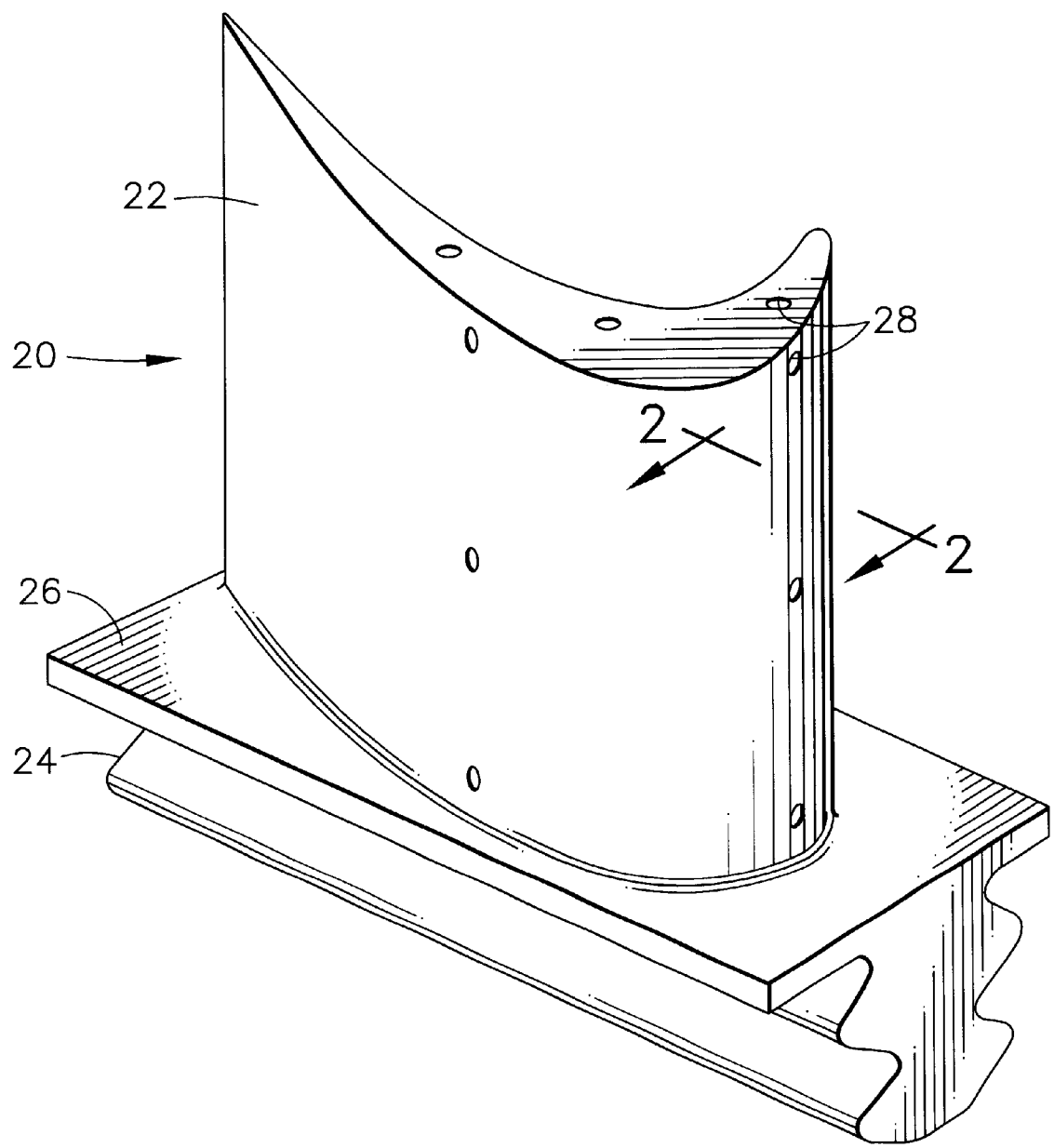
FIG. 1 is a perspective view of a turbine blade.

FIG. 1 depicts a component article of a gas turbine engine such as a turbine blade or turbine vane, and in this illustration a turbine blade 20. The turbine blade 20 is formed of any operable material, but is preferably a nickel-base superalloy. The turbine blade 20 includes an airfoil section 22 against which the flow of hot exhaust gas is directed. (The turbine vane or nozzle has a similar appearance in respect to the pertinent airfoil section, but typically includes other end structure to support the airfoil.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. A number of internal passages extend through the interior of the airfoil 22, ending in openings 28 in the surface of the airfoil 22. During service, a flow of cooling air is directed through the internal passages to reduce the temperature of the airfoil 22.

Figure 2:
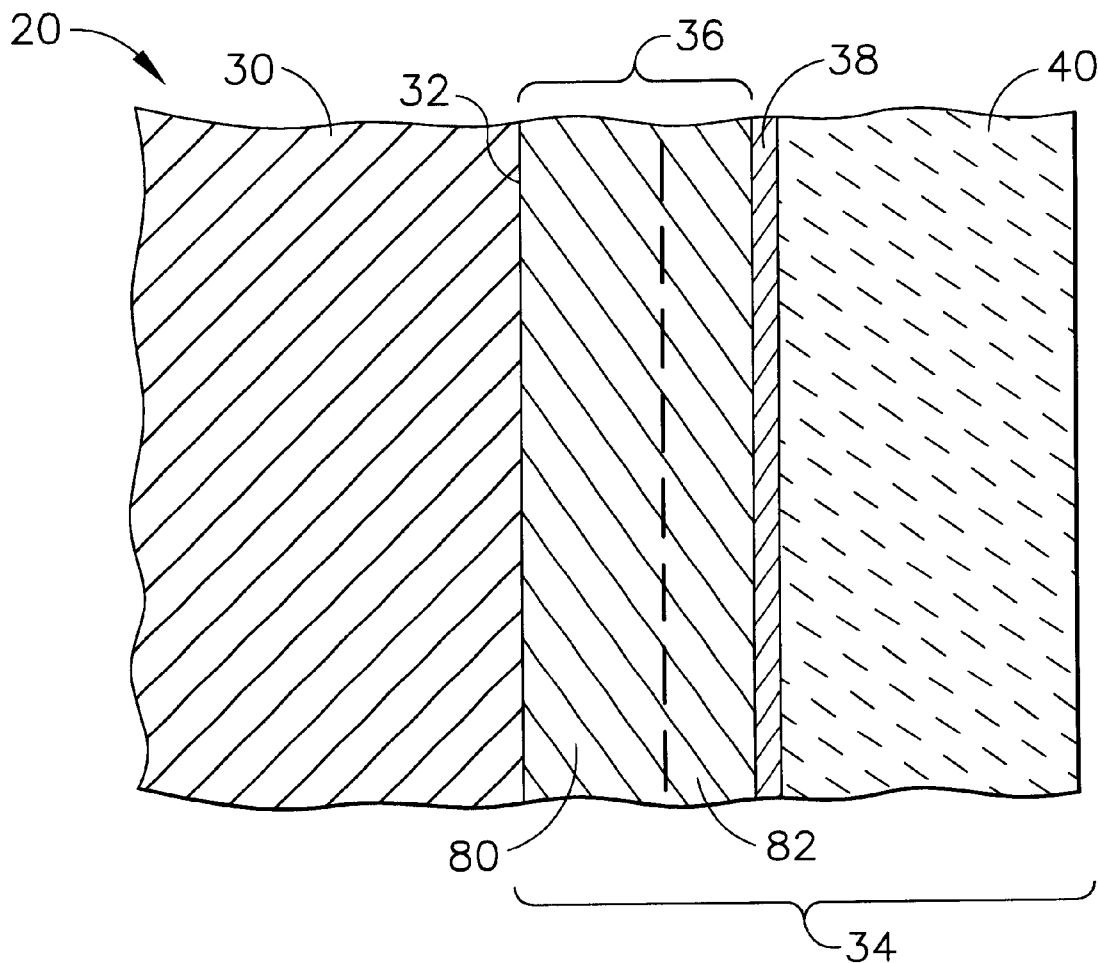
FIG. 2 is an enlarged schematic sectional view through the turbine blade of FIG. 1, taken on lines 2—2.

FIG. 2, which is not drawn to scale, is a schematic sectional view through a portion of a portion of the turbine blade 20, here the airfoil section 22. The turbine blade 20 has a body that serves as a substrate 30 with a surface 32. A protective structure 34 overlies and contacts the surface 32. The protective structure 34 includes an iridium-aluminum protective coating 36 that overlies and contacts the surface 32 of the substrate 30. The protective coating 36 preferably comprises at least about 70 percent by weight iridium, and most preferably comprises from about 70 to about 90 percent by weight iridium. If the protective coating 36 has less than about 70 percent by weight iridium (which is near the eutectic point of the iridium-aluminum system), the oxygen-barrier properties of the iridium become too diluted and the oxygen-barrier effectiveness is degraded, and the melting point of the protective coating 36 is reduced so that it may be prone to melting in a high-temperature environment. If the protective coating 36 has more than about 90 percent by weight iridium, the high-iridium alloy is subject to vaporization in air at temperatures above about 1390K, near the service temperature of the protected article. The protective coating 36 preferably comprises from about 10 to about 30 percent by weight aluminum. The balance of the protective coating 36 is elements diffused into the protective coating 36 from the substrate 30, such as nickel, chromium, and the like. During fabrication and service, an aluminum oxide layer 38, often termed a "scale", forms on the outwardly facing surface of the iridium-aluminum protective coating 36.

The iridium-aluminum protective coating 36 preferably has a thickness of from about 10 to about 125 micrometers. If the protective coating 36 is thinner than about 10 micrometers, it does not impart sufficient oxygen impermeability. If the protective coating 36 is thicker than about 125 micrometers, the added thickness provides no improvement in performance and there is a waste of the expensive iridium. Additionally, the overly thick protective coating 36 may tend to de-adhere from the surface 32 during service.

Optionally, a ceramic thermal barrier coating 40 overlies and contacts the protective coating 36. The ceramic thermal barrier coating 40 is preferably from about 0.003 to about 0.010 inch thick, most preferably about 0.005 inch thick. The ceramic thermal barrier coating 40 is preferably yttria-stabilized zirconia, which is zirconium oxide containing from about 3 to about 12 weight percent, preferably from about 4 to about 8 weight percent, of yttrium oxide. Other operable ceramic materials may be used as well. The ceramic thermal barrier coating 40 may be deposited by any operable technique, such as electron beam physical vapor deposition or plasma spray.

Figure 3:
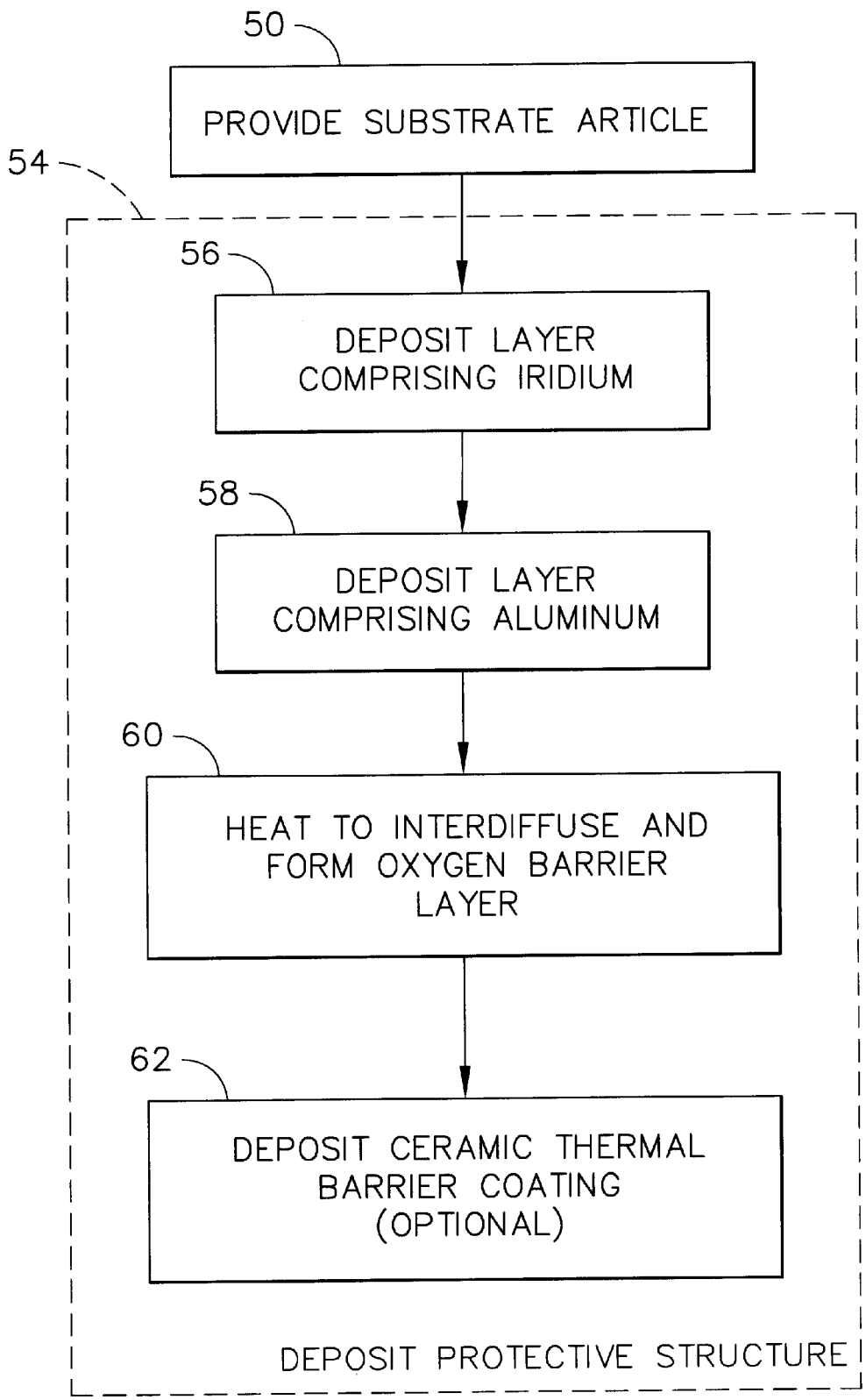
FIG. 3 is a block flow diagram of an approach for preparing a coated gas turbine airfoil.

FIG. 3 is a block flow diagram of a preferred method for practicing the invention. An article and thence the substrate 30 are provided, numeral 50. The article is preferably a component of a gas turbine engine such as a gas turbine blade (as in FIG. 1) or vane (or "nozzle", as the vane is sometimes called). The article is most preferably made of a nickel-base superalloy. As used herein, "nickel-base" means that the composition has more nickel present than any other element. The nickel-base superalloys are typically of a composition that is strengthened by the precipitation of gamma-prime phase. The preferred nickel-base alloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 10.5 percent hafnium, balance nickel and incidental impurities.

A most preferred alloy composition is Rene' N5, which has a nominal composition in weight percent of about 7.5 percent cobalt, about 7 percent chromium, about 6.2 percent aluminum, about 6.5 percent tantalum, about 5 percent tungsten, about 10.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; Rene 142, which has a nominal composition, in weight percent, of about 12 percent cobalt, about 6.8 percent chromium, about 10.5 percent molybdenum, about 4.9 percent tungsten, about 6.4 percent tantalum, about 6.2 percent aluminum, about 2.8 percent rhenium, about 0.5 percent hafnium, about 0.1 percent carbon, about 0.015 percent boron, balance nickel and incidental impurities; CMSX-4, which has a nominal composition in weight percent of about 9.60 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX-10, which has a nominal composition in weight percent of about 7.00 percent cobalt, about 2.65 percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 10.5 percent titanium, balance nickel and incidental impurities; PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities; and ND-4, which has a nominal composition as set forth in U.S. Pat. No. 5,482,789, in weight percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to these preferred alloys, and has broader applicability.

The protective structure 34 is deposited on the surface 32 of the substrate 30, numeral 54. A layer 80 comprising iridium is deposited, numeral 56, overlying and contacting the surface 32 of the substrate 30. The iridium layer 80 is preferably deposited by electrodeposition. Electroplating techniques for depositing iridium layers are known in the art for other purposes and are disclosed, for example, in U.S. Pat. Nos. 4,721,551 and 3,639,219, whose disclosures are incorporated by reference. The iridium layer 80 is preferably pure iridium, but it may be an iridium-containing alloy. The iridium layer 80 is preferably from about 2 micrometers to about 10 micrometers thick.

A layer 82 comprising aluminum and any modifying elements is deposited over the layer comprising iridium 80, numeral 58. The aluminum layer 82 is deposited over the iridium layer 80 by any operable approach, with vapor deposition preferred. In that approach, a hydrogen halide activator gas, such as hydrogen chloride, is contacted with aluminum metal or an aluminum alloy to form the corresponding aluminum halide gas. Any modifying elements may be simultaneously doped into the aluminum layer from a corresponding gas, if desired. The aluminum halide gas contacts the substrate 30, depositing the aluminum thereon. The deposition occurs at elevated temperature such as from about 1825° F. to about 1975° F. during a 4 to 20 hour cycle. This technique allows alloying elements such as hafnium, yttrium, zirconium, chromium, or silicon, or combinations thereof, to be co-deposited into the aluminum-containing layer 82 if desired, from the corresponding halide gas. The aluminum layer 82 is preferably from about 0.001 inch to about 0.003 inch thick. The locations of the layers 80 and 82 are indicated by a dashed line in FIG. 2, inasmuch as they interdiffuse during deposition and subsequent heating and thereafter do not exist as discrete layers in the final article.

The layers 80 and 82, along with the underlying substrate 30, are heated to interdiffuse the layers 80 and 82 to form the indium-aluminum protective coating 36, numeral 60 having the iridium rich layer 80 and the aluminum rich layer. The heating 60 may be accomplished entirely as part of the deposition step 58, so that steps 58 and 60 are entirely concurrent. The heating 60 may instead be accomplished partly during the deposition step 58, and partly by additional heating after the deposition step 58 is complete. In the latter case, the heating 60 may continue an additional time of from about 4 to about 16 hours, at a temperature of from about 1800° F. to about 2000° F. Interdiffusion continues when the protected article is heated during service.

The ceramic thermal barrier coating 40 is optionally applied, numeral 62. The application of the ceramic thermal barrier coating is preferably accomplished by electron beam physical vapor deposition or plasma spray.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A protected article, comprising:

a substrate; and a protective structure overlying a surface of the substrate, the protective structure comprising an iridium-aluminum protective coating overlying and contacting the surface of the substrate, wherein the protective coating comprises at least about 70 percent by weight iridium, from about 10 to about 30 percent by weight aluminum, and elements diffused into the protective coating from the substrate, and wherein the protective coating comprises an iridium-rich layer contacting the surface of the substrate and an aluminum-rich layer overlying and contacting the iridium-rich layer.

2. The protected article of claim 1, wherein the protective coating comprises from about 70 to about 90 percent by weight iridium.

3. The protected article of claim 1, wherein the protective structure further includes a ceramic thermal barrier coating overlying the protective coating.

4. The protected article of claim 1, wherein the substrate is a nickel-base alloy.

5. The protected article of claim 1, wherein the substrate is a nickel-base superalloy.

6. The protected article of claim 1, wherein the protective coating has a thickness of from about 10 micrometers to about 125 micrometers.

7. A method of protecting an article, comprising the steps of providing a substrate including at least a portion of the article; and depositing a protective structure overlying a surface of the substrate, the protective structure comprising an iridium-aluminum protective coating overlying the surface of the substrate, wherein the protective coating comprises at least about 70 percent by weight iridium, from about 10 to about 30 percent by weight aluminum, and elements diffused into the protective coating from the substrate, and wherein the protective coating comprises an iridium-rich layer contacting the surface of the substrate and an aluminum-rich layer overlying and contacting the iridium-rich layer.

8. The method of claim 7 wherein the step of depositing the protective structure includes the step of depositing the protective coating comprising from about 70 to about 90 percent by weight iridium.

9. The method of claim 7 wherein the step of depositing the protective structure includes the step of depositing a ceramic thermal barrier coating overlying the protective coating.

10. The method of claim 7 wherein the step of providing a substrate includes the step of providing a nickel-base superalloy substrate.

11. The method of claim 7 wherein the step of depositing the protective structure includes the step of depositing the protective coating having a thickness of from about 10 micrometers to about 125 micrometers.

* * * * *